United States Patent
Yu

(10) Patent No.: US 10,312,711 B2
(45) Date of Patent: Jun. 4, 2019

(54) ELECTRONIC DEVICE AND METHOD FOR DYNAMICALLY CONTROLLING CURRENT OF AN ELECTRONIC DEVICE

(71) Applicant: Quanta Computer Inc., Taoyuan (TW)

(72) Inventor: Chun-Jie Yu, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 64 days.

(21) Appl. No.: 15/604,886

(22) Filed: May 25, 2017

(65) Prior Publication Data

US 2018/0145516 A1  May 24, 2018

(30) Foreign Application Priority Data

Nov. 18, 2016  (TW) .............................. 105137782 A

(51) Int. Cl.
 *H02J 7/00*  (2006.01)
 *G06F 1/26*  (2006.01)

(52) U.S. Cl.
 CPC .............. *H02J 7/007* (2013.01); *G06F 1/266* (2013.01); *H02J 7/0054* (2013.01); *H02J 2007/006* (2013.01); *H02J 2007/0062* (2013.01)

(58) Field of Classification Search
 CPC ........ H02J 7/0068; H02J 7/007; H02J 7/0072; H02J 2007/0062; H02J 2007/0098; G06G 1/263; G06G 1/266
 USPC .......................................... 320/137, 148–149
 See application file for complete search history.

(56) References Cited

U.S. PATENT DOCUMENTS

| | | | |
|---|---|---|---|
| 6,946,817 B2 | 9/2005 | Fischer et al. | |
| 8,736,227 B2 | 5/2014 | Chadbourne et al. | |
| 2009/0032287 A1* | 2/2009 | Takai | B32B 15/08 174/250 |
| 2009/0309419 A1* | 12/2009 | Yamasaki | G06F 1/263 307/39 |
| 2010/0133908 A1* | 6/2010 | Weng | G06F 1/266 307/48 |
| 2011/0047396 A1* | 2/2011 | Kawamoto | G06F 1/263 713/322 |

(Continued)

FOREIGN PATENT DOCUMENTS

| | | |
|---|---|---|
| TW | 201107984 A1 | 3/2011 |
| TW | 201301707 A1 | 1/2013 |

OTHER PUBLICATIONS

Chinese language office action dated May 8, 2017, issued in application No. TW 105137782.

(Continued)

*Primary Examiner* — Paul Dinh
(74) *Attorney, Agent, or Firm* — McClure, Qualey & Rodack, LLP

(57) ABSTRACT

An electronic device includes a device controller and a microprocessor. The device controller is coupled to a device for controlling the device. The microprocessor is coupled to the device controller. The microprocessor obtains information regarding an amount of power consumption of the electronic device and dynamically determines an amount of current provided to the device according to the amount of power consumption. When the microprocessor determines that the amount of power consumption is greater than a threshold, the microprocessor determines to decrease the amount of current provided to the device.

6 Claims, 9 Drawing Sheets

(56) References Cited

U.S. PATENT DOCUMENTS

2012/0293136 A1* 11/2012 Chen ................ G06F 1/266
                                                320/162
2014/0306529 A1* 10/2014 Yin ................. H02J 7/0068
                                                 307/31

OTHER PUBLICATIONS

Chinese language office action dated Oct. 17, 2017, issued in application No. TW 10621046410.

* cited by examiner

ELECTRONIC DEVICE AND METHOD FOR DYNAMICALLY CONTROLLING CURRENT OF AN ELECTRONIC DEVICE

CROSS REFERENCE TO RELATED APPLICATIONS

This Application claims priority of Taiwan Patent Application No. 105137782, filed on Nov. 18, 2016, the entirety of which is incorporated by reference herein.

BACKGROUND OF THE INVENTION

Field of the Invention

The invention relates to a dynamic current control method, which is capable of dynamically controlling the amount of current drawn by a low-efficiency device and improving the operational efficiency of an electronic device system.

Description of the Related Art

Electronic devices such as notebook computers have multiple input/output interfaces of different types for connecting external devices. In addition to communicating with the electronic device, an external device connected to the electronic device usually receives power from the electronic device via the input/output interface. Therefore, for the electronic device, charging the external device is a major factor affecting power consumption and operational efficiency.

However, the total amount of power that can be obtained from a power source of the electronic device is usually designed to be fixed. Therefore, when the electronic device is connected to too many external devices, too much power will be consumed, reducing the operational efficiency of the electronic device. Therefore, a dynamic current control method is required to improve operational efficiency of the electronic device system.

BRIEF SUMMARY OF THE INVENTION

Electronic devices and methods for dynamically controlling a current of an electronic device are provided. An exemplary embodiment of an electronic device includes a device controller and a microprocessor. The device controller is coupled to a device for controlling the device. The microprocessor is coupled to the device controller. The microprocessor obtains information regarding an amount of power consumption of the electronic device and dynamically determines an amount of current provided to the device according to the amount of power consumption. When the microprocessor determines that the amount of power consumption is greater than a threshold, the microprocessor determines to decrease the amount of current provided to the device.

An exemplary embodiment of a method for dynamically controlling a current of an electronic device comprises: obtaining information regarding an amount of power consumption of the electronic device, wherein the amount of power consumption is related to the loading of the electronic device; and dynamically determining an amount of current provided to a device according to the amount of power consumption. When the amount of power consumption is greater than a threshold, decreasing the amount of current provided to the device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
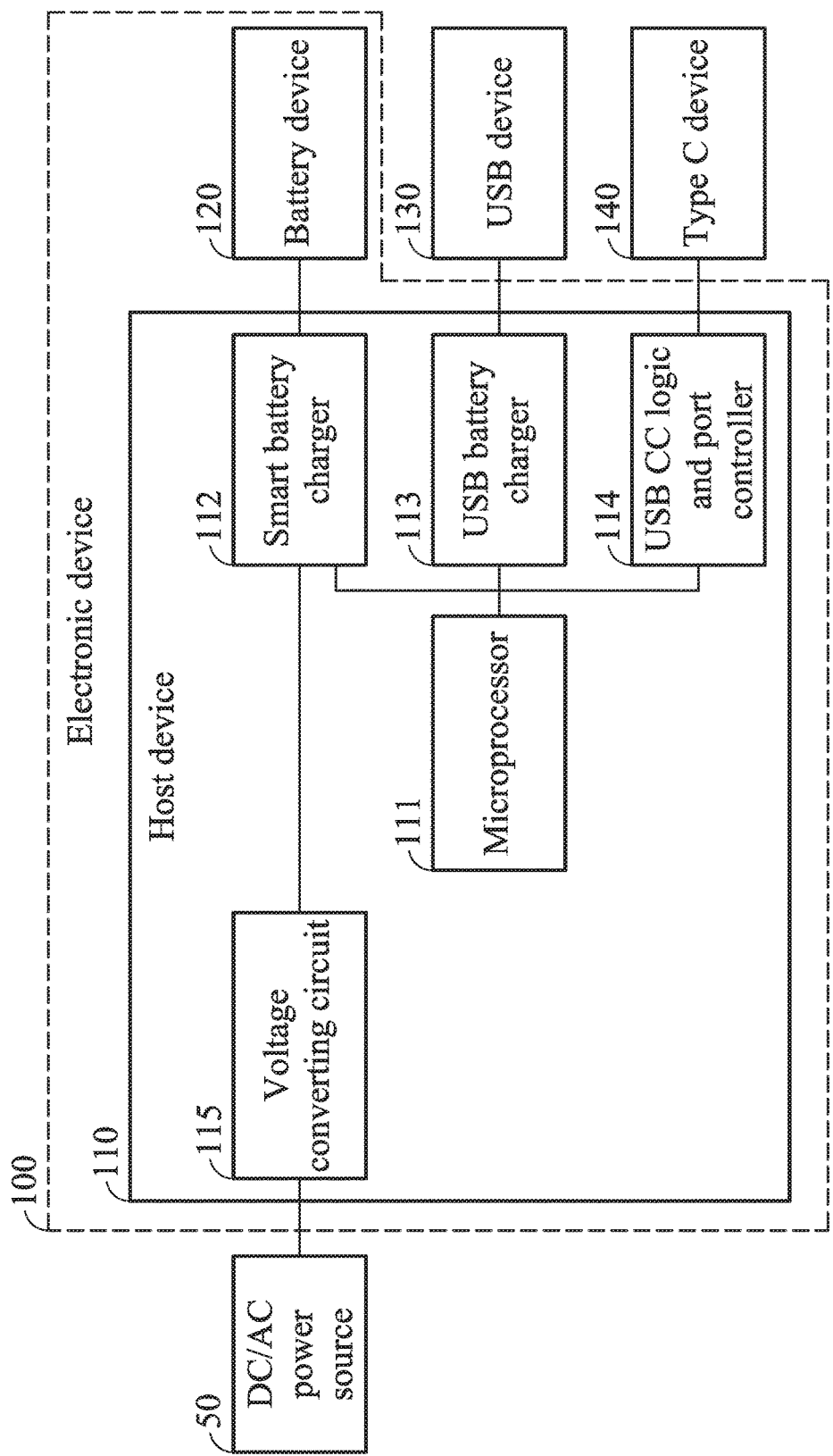
FIG. 1 is a block diagram of an electronic device according to an embodiment of the invention.

FIG. 1 is a block diagram of an electronic device according to an embodiment of the invention. The electronic device 100 may comprise a host device 110 and a battery device 120. The battery device 120 is a rechargeable battery device, provided as one of the power sources of the electronic device 100.

The host device 110 may at least comprise a microprocessor 111, a smart battery charger (SBC) 112, a USB battery charger 113, a USB configuration channel (CC) logic and port controller 114 and a voltage converting circuit 115.

The electronic device 100 may provide a plurality of input/output interfaces of different types for connecting external devices. For example, the electronic device may be coupled or connected to one or more external devices, such as a USB device 130 and the type C device 140 shown in FIG. 1, via the corresponding input/output interface (not shown in the figure), such as a USB port, a type C port, etc.

It should be noted that, in order to clarify the concept of the invention, FIG. 1 presents a simplified block diagram in which only the elements relevant to the invention are shown. It will be appreciated by those who are skilled in this technology that the electronic device can further comprise other components to provide specific functionality. Therefore, the invention should not be limited to what is shown in FIG. 1.

The voltage converting circuit 115 performs adequate voltage conversion on the power provided by the DC/AC power source 50, so as to provide an adequate voltage to the host device 110 and the battery device 120.

The smart battery charger 112 is coupled to the battery device 120 for controlling a charging operation and a discharging operation of the battery device 120. The smart battery charger 112 provides the charging and discharging circuits for extracting power from the battery device 120 in a discharging operation of the battery device 120 and provides charging current to the battery device 120 in a charging operation of the battery device 120. The source of the power provided to the battery device 120 in the charging operation thereof may be the external DC/AC power source 50.

The USB battery charger 113 controls the charging operations of the USB device, including providing the charging current to the USB device 130.

The USB CC logic and port controller 114 controls the charging operations of the type C device, including providing the charging current to the type C device 140.

The microprocessor 111 is coupled to the smart battery charger 112, the USB battery charger 113 and the USB CC logic and port controller 114 for controlling the operations thereof.

According to an embodiment of the invention, the microprocessor 111 obtains information regarding the amount of power consumption of the electronic device 100. The amount of power consumption is the total power consumption of the electronic device system (that is, a whole system including the software and the hardware devices of the electronic device 100) at present, which is related to the amount of loading of the electronic device 100. For example, the microprocessor 111 may determine whether the electronic device 100 is currently under a heavy loading or a light loading according to the power consumption of the electronic device 100, and dynamically control the amount of current drawn by other devices from the electronic device 100 according to the loading, so as to improve the operational efficiency of the electronic device system.

According to an embodiment of the invention, the microprocessor 111 may obtain information regarding the amount of power consumption of the electronic device 100 from the smart battery charger 112. The smart battery charger 112 comprises a sensing resistor (not shown) for detecting the total power consumption of the electronic device system in real-time. According to another embodiment of the invention, the microprocessor 111 may also detect the total power consumption of the electronic device via other power circuits (not shown).

Figure 2:
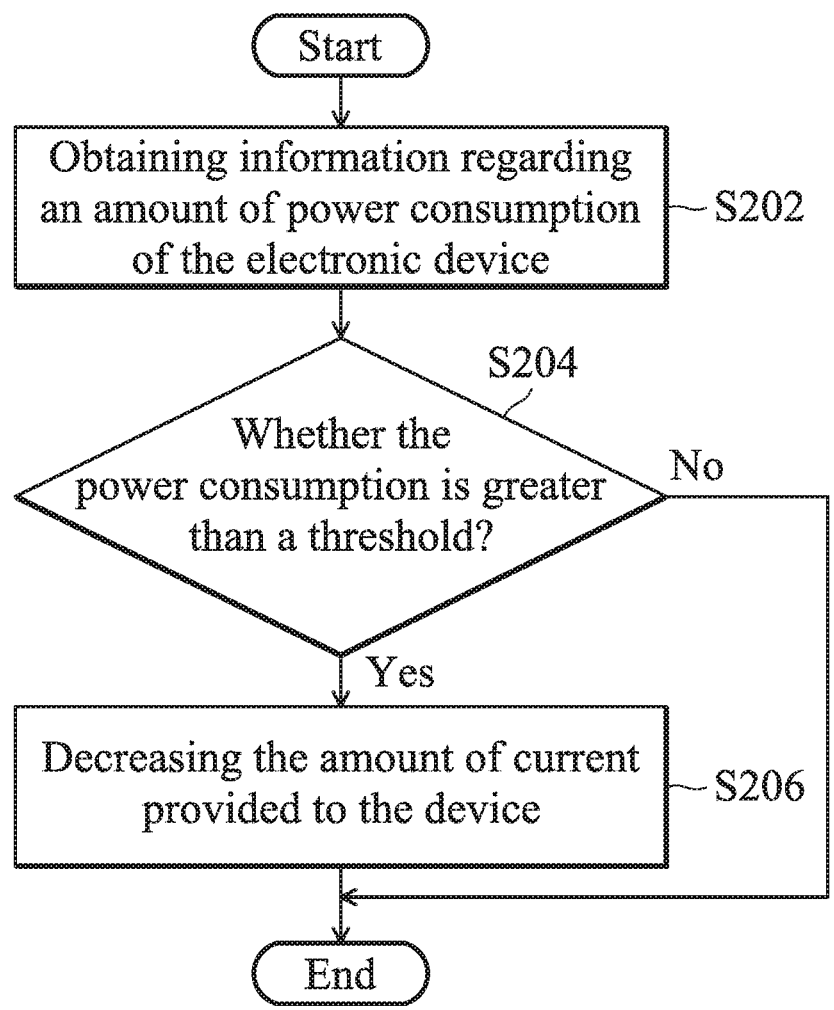
FIG. 2 is a flow chart of a method for dynamically controlling current of an electronic device according to an embodiment of the invention.

FIG. 2 is a flow chart of a method for dynamically controlling current in an electronic device according to an embodiment of the invention. First of all, the microprocessor 111 may obtain information regarding the amount of power consumption of the electronic device (Step S202). The amount of power consumption may reflect or be related to the amount of loading of the electronic device at present. Next, the microprocessor 111 may dynamically determine the amount of current provided to a device according to the amount of power consumption. The microprocessor 111 may determine whether the power consumption is greater than a threshold (Step S204). When the amount of power consumption is greater than a threshold, the microprocessor 111 may decrease the amount of current provided to the device (Step S206). When the amount of power consumption is not greater than the threshold, the microprocessor 111 may determine not to decrease the amount of current provided to the device. That is, the microprocessor 111 may resume the initial setting, or may keep providing a decreased amount of current to the device for a period of time, and resume the initial setting after the period of time so as to maintain the stability of the system.

According to an embodiment of the invention, the device as discussed above may be a low-efficiency device in the electronic device system, such as the battery device 120, USB device 130 and the type C device 140 shown in FIG. 1. The so-called low-efficiency device may be a device that operates on a lower operation frequency or a lower operation voltage. Therefore, the impact on the operational efficiency of the electronic device system is small when decreasing the amount of current provided to the low-efficiency device. Since the total amount of power that can be provided by the electronic device is fixed, regardless of whether power is obtained from the external DC/AC power source 50 or from the battery device 120, when the current provided to the low-efficiency device is decreased, the remaining current can be reserved for the system to dynamically provide to a high-efficiency device, such as the CPU or GPU that operates on a higher operation frequency or a higher operation voltage. Since the impact on the operational efficiency of the electronic device system is high for the operation of a high-efficiency device, when providing extra current to the high-efficiency device, the operational efficiency of the electronic device can be significantly improved.

According to an embodiment of the invention, a device controller may initially set the maximum allowable current drawn by the device to a first value according to a setting value, and when the microprocessor 111 determines that the amount of power consumption is greater than the threshold, the microprocessor 111 instructs the device controller to adjust the setting value, so as to set the maximum allowable current to a second value that is lower than the first value.

According to the embodiments of the invention, the device controller is a controller for controlling the operations of the low-efficiency device.

According to a first embodiment of the invention, the device controller may be a battery controller for controlling the battery device 120, such as the smart battery charger 112 shown in FIG. 1. When the device controller is the smart battery charger 112 for controlling the battery device 120, the setting value is the amount of charging current required by the battery device 120. Generally, the microprocessor 111 reads the information regarding the amount of charging current required by the battery device 120 from the battery device 120 and provides the information to the smart battery charger 112. The microprocessor 111 may read information regarding the amount of charging current required by the battery device 120 from the parameters carried by the battery device 120 on the bus.

As to the actual charging current of the battery device (that is, the actual charging current that is eventually provided to the battery device), it is determined based on the function Min{the charging current required by the battery device, the charging current that the electronic device is capable of providing}, where the function Min{A, B} returns the minimum value among the values A and B. The charging current that the electronic device is capable of providing may be determined by the smart battery charger 112 based on the total power consumption of the electronic device system at present.

Therefore, in the conventional design, when the loading of the electronic device is light, the charging current required by the battery device may be smaller than the charging current that the electronic device is capable of providing. The smart battery charger 112 may eventually determine to take the charging current required by the battery device and set it as the actual charging current of the battery device.

When the loading of the electronic device is heavy, the charging current that the electronic device is capable of providing may be smaller than the charging current required by the battery device. The smart battery charger 112 may eventually determine to take the charging current that the electronic device is capable of providing and set it as the actual charging current of the battery device.

However, in this manner, when the loading of the electronic device is heavy, there will be no extra current reserved for the system to dynamically provide to the high-efficiency device. When the loading of the electronic device is increased further, the operation frequency of the high-efficiency device, such as the CPU or GPU may have to be decreased, and the operational efficiency of the electronic device may be degraded.

To solve this problem, and to further improve the operational efficiency of the electronic device, according to a first embodiment of the invention, when the microprocessor 111 determines that the amount of power consumption is greater than the threshold, the microprocessor 111 may determine to adjust the amount of charging current required by the battery device 120 from an actual required charging current (that is, the charging current required by the battery device read from the battery device by the microprocessor 111) to a low charging current, and provide information regarding the low charging current as the charging current required by the battery device to the smart battery charger 112 as the setting of a charging current of the battery device. The low charging current may be set to a value that is lower than the charging current that the electronic device is capable of providing and also lower than the actual required charging current of the battery device 120.

When the amount of charging current required by the battery device 120 is adjusted to the low charging current that is lower than the charging current that the electronic device is capable of providing and also lower than the actual required charging current of the battery device 120, the smart battery charger 112 may eventually determine to set the low charging current as the actual charging current of the battery device. Since the actual charging current of the battery device is lower than the charging current that the electronic device is capable of providing, the remaining current that is not provided may be reserved for the system to dynamically provide to the high-efficiency device. In this manner, the high-efficiency device can obtain more power to further improve the operational efficiency of the electronic device.

Note that according to an embodiment of the invention, to further improve system stability, when the microprocessor 111 determines that the power consumption is greater than the threshold, the microprocessor 111 may decrease the operation frequency of the high-efficiency device, such as the CPU or GPU, in advance, and then apply the dynamic current control method as illustrated above.

According to a second embodiment of the invention, the device controller may be an external device controller for controlling the external device coupled or connected to the electronic device via the input/output port, such as the USB battery charger 113 or the USB CC logic and port controller 114 as shown in FIG. 1. When the device controller is the USB battery charger 113 or the USB CC logic and port controller 114, the setting value may be a port type or a current mode.

Generally, the port type or the current mode of an external device is selected based on the charging/power mode of the electronic device. Therefore, in the conventional design, when the charging/power mode of the electronic device is not changed, the port type or the current mode of the external device will not be changed.

However, according to the second embodiment of the invention, when the microprocessor 111 determines that the amount of power consumption is greater than the threshold, the microprocessor 111 may instruct the USB battery charger 113 or the USB CC logic and port controller 114 to adjust the original setting value of the port type or current mode, so that the maximum allowable current drawn by the device in the adjusted port type or the adjusted current mode is reduced.

Table 1 shows the maximum allowable current drawn by the device defined for different port types.

TABLE 1 the maximum allowable current drawn by the device defined for different port

| Port type | Whether USB 2.0 communication is supported | Maximum allowable current (drawn by external device) |
| --- | --- | --- |
| Standard downstream port (SDP) (USB2.0) | Yes | 0.5 A |
| SDP (USB3.0) | Yes | 0.9 A |
| Charging downstream port | Yes | 1.5 A |
| Dedicated downstream port | No | 1.5 A | types

Table 2 shows the maximum allowable current drawn by the device (the maximum output current of a single port) defined for different current modes for a type C device.

TABLE 2 the maximum allowable current drawn by the type C device in different current modes

| Current mode | |
| --- | --- |
| Default | 500 mA (USB 2.0) |
| | 900 mA (USB 3.1) |
| | Medium-1.5 A |
| | High-3 A |

Generally speaking, in order to make an external device draw a greater amount of current, the system sets the port type of a USB device to a Charging Downstream Port (CDP) or sets the current mode of a type C device to a High Charging Current (HCC).

However, according to the second embodiment of the invention, for a USB device, when the microprocessor 111 determines that the amount of power consumption is greater than the threshold, the microprocessor 111 may instruct the USB battery charger 113 to adjust the port type of the USB device from the CDP to the SDP. In this manner, the maximum allowable current drawn by the USB device is limited to a lower value than the CDP. Since the maximum allowable current drawn by the USB device is lower than the charging current that the electronic device is capable of providing, the remaining current that is not provided may be reserved for the system to dynamically provide to the high-efficiency device. In this manner, the high-efficiency device can obtain more power to further improve the operational efficiency of the electronic device.

On the other hand, for the type C device, when the microprocessor 111 determines that the amount of power consumption is greater than the threshold, the microprocessor 111 may instruct the USB CC logic and port controller 114 to adjust the current mode of the type C device from the high charging current to the medium charging current (MCC) or the default charging current (DCC). In this manner, the maximum allowable current drawn by the type C device is limited to a lowered value. Since the maximum allowable current drawn by the type C device is lower than the charging current that the electronic device is capable of providing, the remaining current that is not provided may be reserved for the system to dynamically provide to the high-efficiency device. In this manner, the high-efficiency device can obtain more power to further improve the operational efficiency of the electronic device.

Note that according to an embodiment of the invention, to further improve the system stability, when the microprocessor 111 determines that power consumption is no longer greater than the threshold, the microprocessor 111 may keep applying the current control method as illustrated above for a period of time, and then resume the initial setting after the period of time so as to maintain the stability of the system. For example, after the microprocessor 111 applies the current control method illustrated above for a period of time, the microprocessor 111 may then resume the setting of the amount of charging current required by the battery device 120 to the actual required charging current (that is, the charging current required by the battery device read from the battery device by the microprocessor 111). Or, after the microprocessor 111 applies the current control method as illustrated above for a period of time, the microprocessor 111 may then instructs the USB battery charger 113 to adjust the port type of the USB device to the CDP. Alternatively, after the microprocessor 111 has applied the current control method for a period of time as illustrated above, the microprocessor 111 may then instruct the USB CC logic and port controller 114 to adjust the current mode of the type C device to the high charging current (HCC).

Several embodiments of the dynamic current control method will be illustrated in more detailed flow charts and discussed in the following paragraphs.

Figure 3:
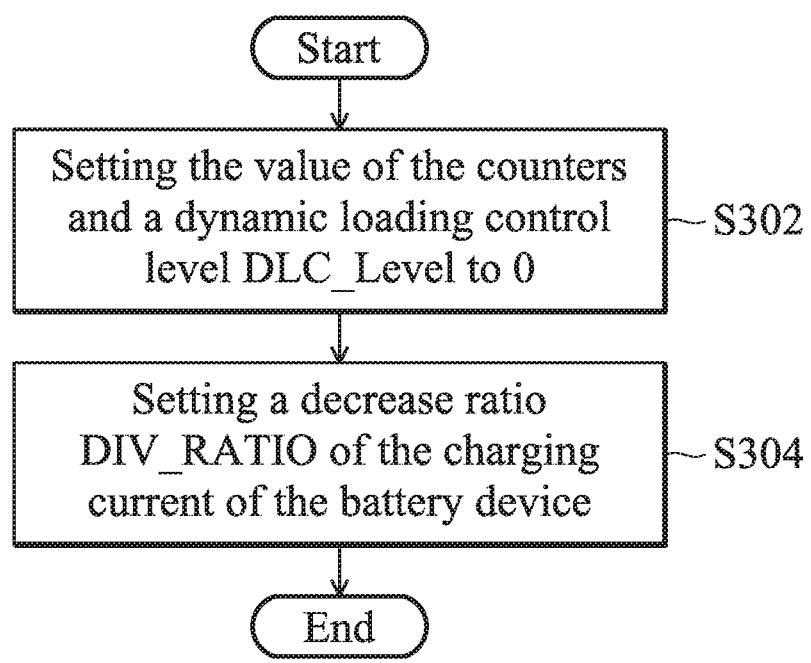
FIG. 3 is a flow chart of the dynamic current control method for initializing the parameters according to an embodiment of the invention.

FIG. 3 is a flow chart of the dynamic current control method for initializing the parameters according to an embodiment of the invention. First of all, the value of the counters and a dynamic loading control level DLC_Level is set to 0 (Step S302). In the embodiment of the invention, four counters are used, including the counter_1, the counter_2, the counter_3 and the counter_4. The counter_1 is used to set the maintenance time of decreasing the charging current of the battery device. The counter_2 is used to set the maintenance time of decreasing the charging current of the USB device. The counter_3 and the counter_4 are used to set the maintenance time of decreasing the charging current of the type C device. Next, a decrease ratio DIV_RATIO of the charging current of the battery device is set (Step S304). The decrease ratio DIV_RATIO is a parameter used for adjusting the actual charging current of the battery device (that is, the actual charging current that is eventually provided to the battery device) to a lower value.

Figure 4:
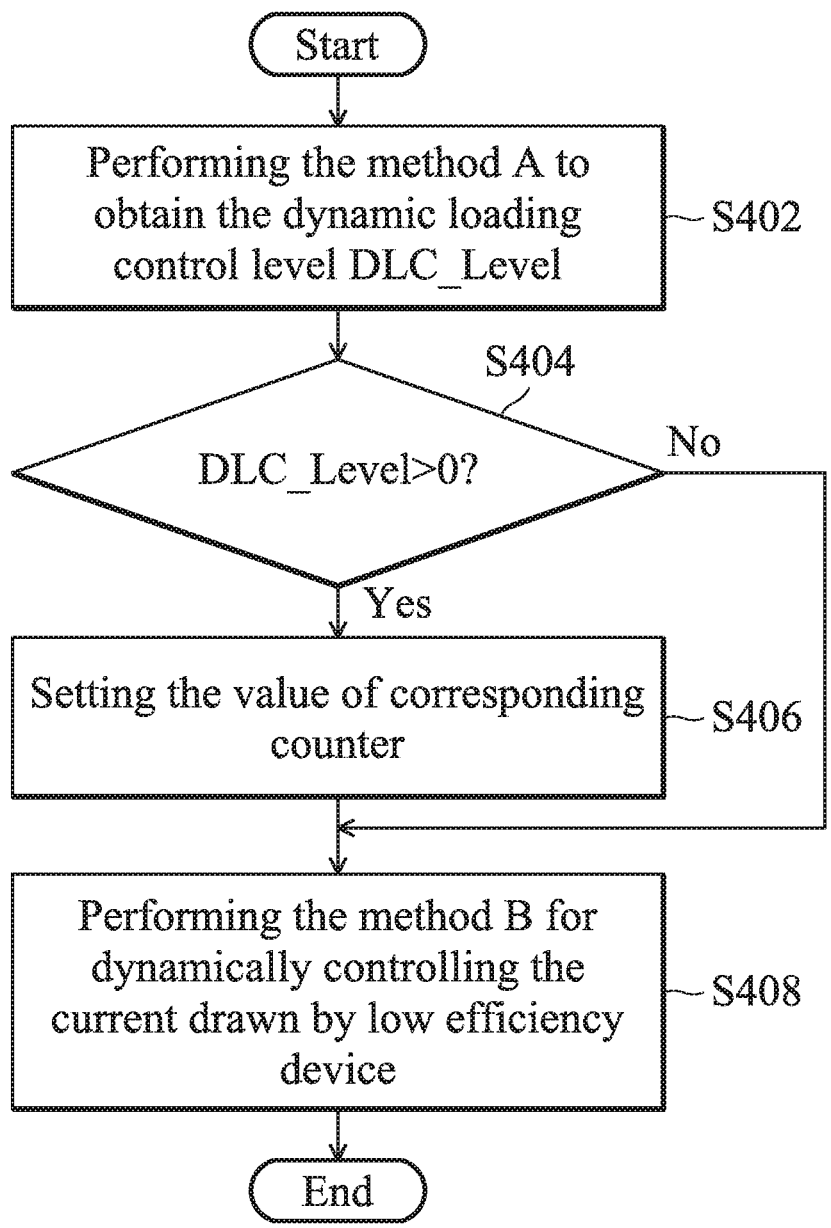
FIG. 4 is a main flow chart of the dynamic current control method according to an embodiment of the invention.

FIG. 4 is a main flow chart of the dynamic current control method according to an embodiment of the invention. The main flow chart shown in FIG. 4 may be performed after the initialization of the parameters is completed. First of all, the method A is performed to obtain the dynamic loading control level DLC_Level (Step S402). The dynamic loading control level DLC_Level is an indicator to determine whether the dynamic current control method discussed above is to be performed, or whether the operation frequency of the CPU or GPU is to be decreased. Next, whether the DLC_Level is greater than 0 is determined (Step S404). If so, the value of the corresponding counter is set (Step S406). That is, the value of the counter is set to the corresponding maintenance time as described above. Next, the method B for dynamically controlling the current drawn by a low-efficiency device is performed (Step S408). If the DLC_Level is not greater than 0, the method B is performed directly (Step S408).

Figure 5:
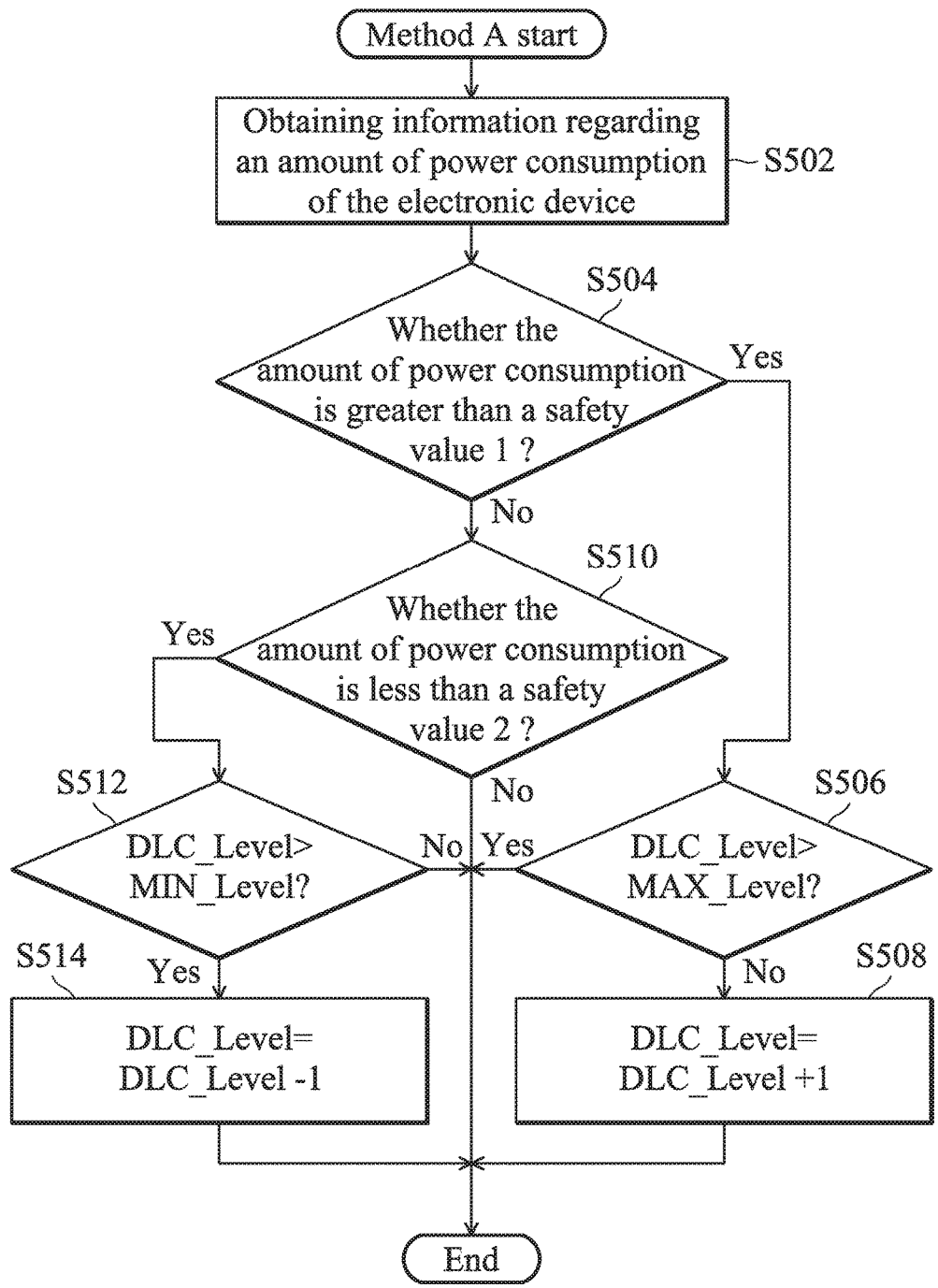
FIG. 5 is a flow chart of method A of the dynamic current control method according to an embodiment of the invention.

FIG. 5 is a flow chart of method A of the dynamic current control method according to an embodiment of the invention. First of all, the microprocessor 111 obtains information regarding the power consumption of the electronic device (Step S502). Next, the microprocessor 111 determines whether the power consumption is greater than a safety value 1 (that is, the threshold discussed above) (Step S504). If so, the microprocessor 111 further determines whether the dynamic loading control level DLC_Level is greater than the maximum level MAX_Level (Step S506). The maximum level MAX_Level represents the level at which the system has the poorest operational efficiency. If not, it means that the operational efficiency has not yet reached the poorest level. In this manner, the dynamic loading control level DLC_Level can be increased by 1 (Step S508). If the dynamic loading control level DLC_Level is greater than the maximum level MAX_Level, the dynamic loading control level DLC_Level will not be increased and the process ends.

If the amount of power consumption is not greater than a safety value 1, the microprocessor 111 further determines whether amount of power consumption is less than a safety value 2 (Step S510). If so, the microprocessor 111 further determines whether the dynamic loading control level DLC_Level is greater than the minimum level MIN_Level (Step S512). The minimum level MIN_Level is the level at which the system has the best operational efficiency. If so, it means that the operational efficiency has not yet reached the highest level. In this manner, the dynamic loading control level DLC_Level can be decreased by 1 (Step S514). If the dynamic loading control level DLC_Level is not greater than the minimum level MIN_Level, the dynamic loading control level DLC_Level will not be decreased and the process ends.

If the amount of power consumption is not less than a safety value 2, it means that the amount of power consumption now falls in a predetermined region. In this manner, the dynamic loading control level DLC_Level will not be changed and the process ends. According to an embodiment of the invention, the safety value 1 may be set as the upper limit of the system power consumption, and the safety value 2 may be set as the lower limit of the system power consumption, and the safety value 1 is greater than the safety value 2. The safety value 1 and safety value 2 define the predetermined region.

Figure 6:
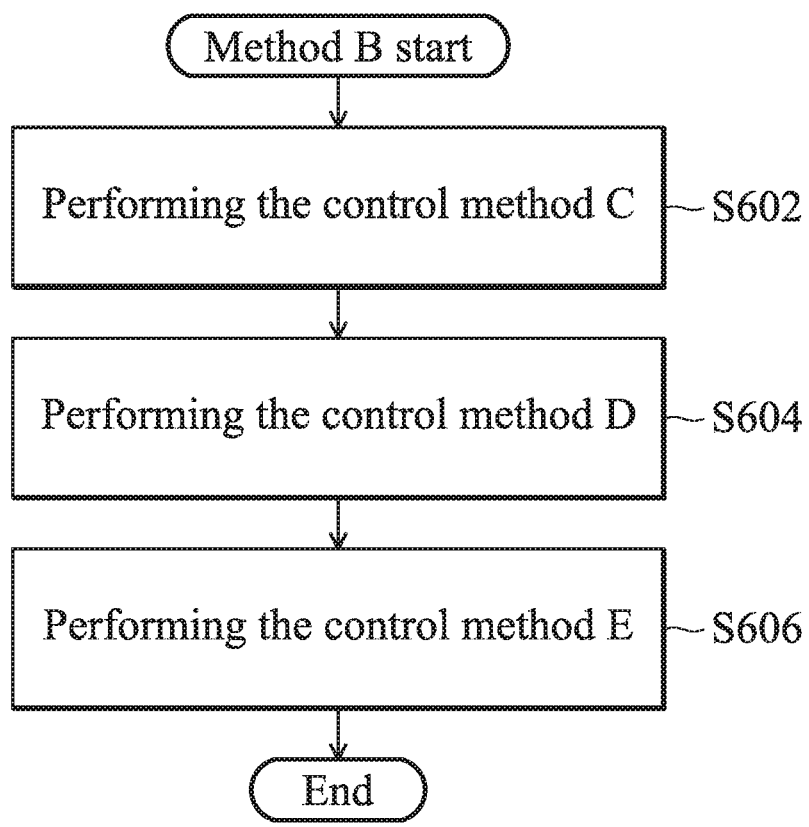
FIG. 6 is a flow chart of method B of the dynamic current control method according to an embodiment of the invention.

FIG. 6 is a flow chart of method B of the dynamic current control method according to an embodiment of the invention. In the flow chart shown in FIG. 6, the method B comprises the steps of performing the control method C (Step S602), performing the control method D (Step S604) and performing the control method E (Step S606). The control methods C, D and E respectively represent the embodiments of dynamically decreasing the charging current of the battery device, dynamically decreasing the charging current of the USB device and dynamically decreasing the charging current of the type C device. However, it should be noted that the method B may comprise one or more of the control methods C, D and E, or any combination thereof. Therefore, the method B may also be designed to perform any one or two of the control methods C, D and E, and the invention should not be limited to any specific implementation method. In addition, the order of performing the control methods C, D and E is not limited to any specific order. The control methods C, D and E are illustrated in more detail in the following paragraphs.

Figure 7:
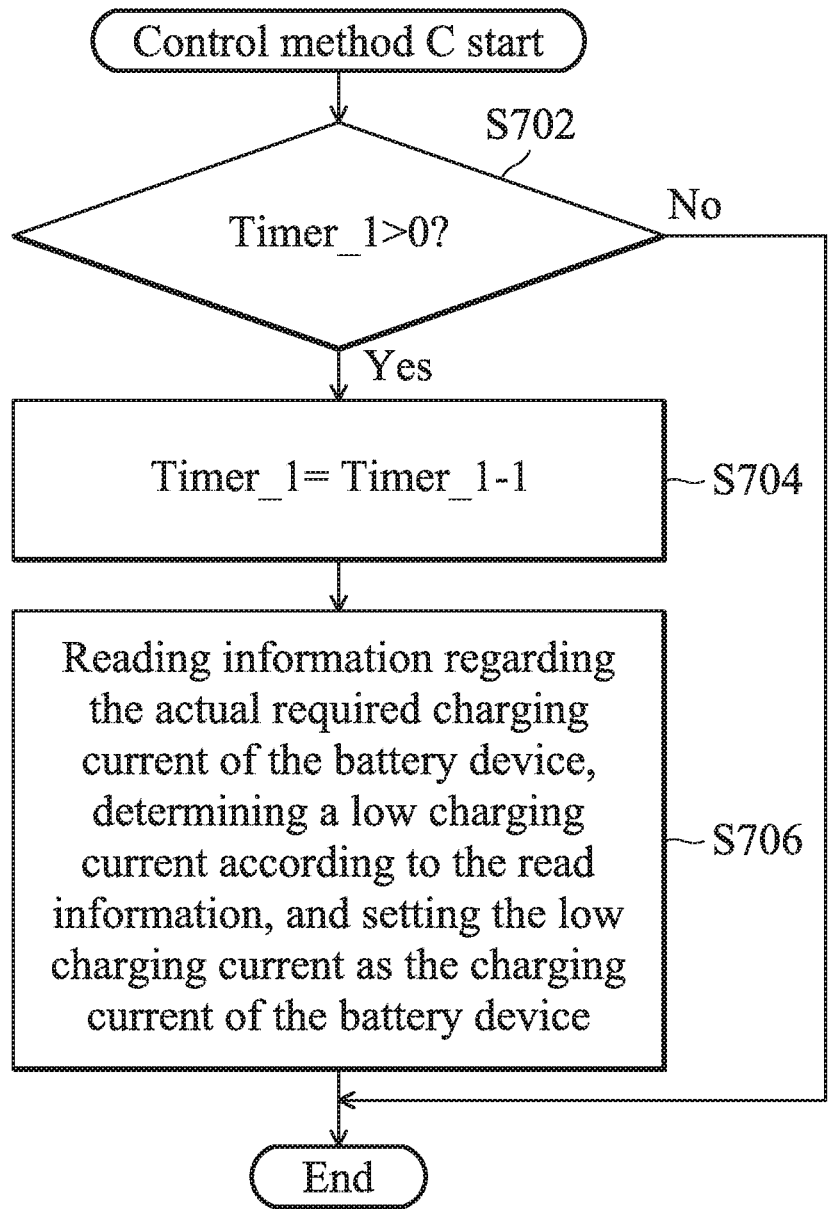
FIG. 7 is a flow chart of the dynamic current control method (the control method C) according to an embodiment of the invention.

FIG. 7 is a flow chart of the dynamic current control method (the control method C) according to an embodiment of the invention. First of all, whether the value Timer_1 of the counter_1 is greater than 0 is determined (Step S702). If not, the process ends. If so, the microprocessor 111 decreases the value Timer_1 of the counter_1. For example, the value Timer_1 of the counter_1 is decreased by 1 (Step S704). Next, the microprocessor 111 reads information regarding the charging current required by the battery device (i.e. the actual required charging current), determines a low charging current according to the read information, and provides the low charging current to the battery controller as the setting of a charging current of the battery device (Step S706). According to an embodiment of the invention, the low charging current may be set as a value that is obtained by dividing the value of the actual required charging current by the decrease ratio DIV_RATIO, where the decrease ratio DIV_RATIO has been set as a non-zero value in step S304.

Figure 8:
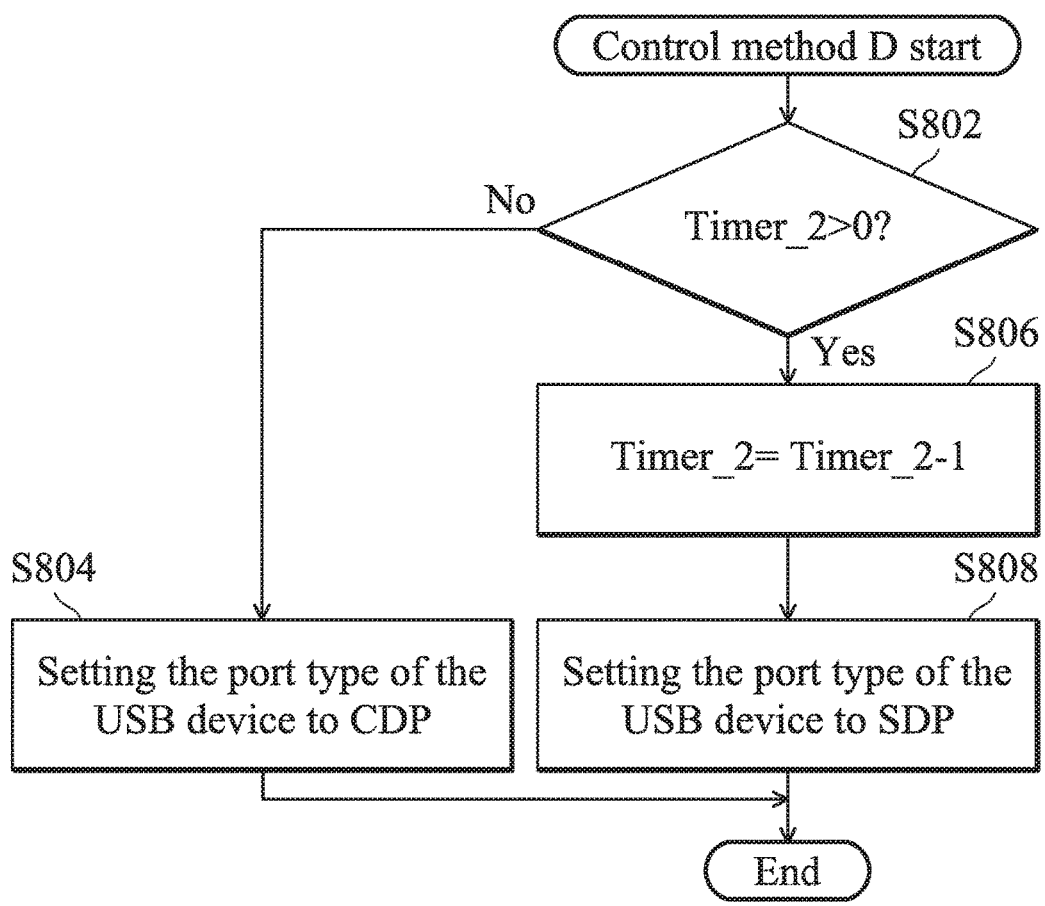
FIG. 8 is a flow chart of the dynamic current control method (the control method D) according to an embodiment of the invention.

FIG. 8 is a flow chart of the dynamic current control method (the control method D) according to an embodiment of the invention. First of all, whether the value Timer_2 of the counter_2 is greater than 0 is determined (Step S802). If not, the port type of the USB device remains CDP (Step S804). If so, the microprocessor 111 decreases the value Timer_2 of the counter_2. For example, the value Timer_2 of the counter_2 is decreased by 1 (Step S806). Next, the microprocessor 111 notifies the USB battery charger 113 of the need to set the port type of the USB device to SDP (Step S808), so as to decrease the maximum allowable current.

Figure 9:
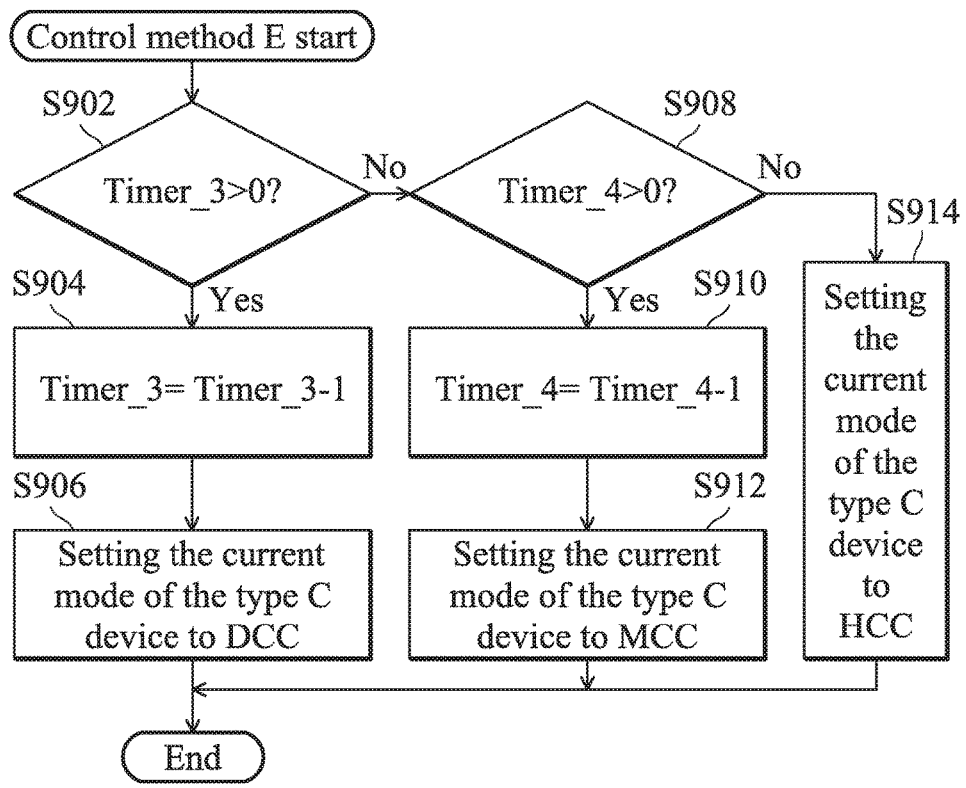
FIG. 9 is a flow chart of the dynamic current control method (the control method E) according to an embodiment of the invention.

FIG. 9 is a flow chart of the dynamic current control method (the control method E) according to an embodiment of the invention. First of all, whether the value Timer_3 of the counter_3 is greater than 0 is determined (Step S902). If so, the microprocessor 111 decreases the value Timer_3 of the counter_3. For example, the value Timer_3 of the counter_3 is decreased by 1 (Step S904). Next, the microprocessor 111 notifies the USB CC logic and port controller 114 of the need to set the current mode of the type C device to DCC (Step S906).

If the value Timer_3 of the counter_3 is not greater than 0, whether the value Timer_4 of the counter_4 is greater than 0 is further determined (Step S908). If so, the microprocessor 111 decreases the value Timer_4 of the counter_4. For example, the value Timer_4 of the counter_4 is decreased by 1 (Step S910). Next, the microprocessor 111 notifies the USB CC logic and port controller 114 of the need to set the current mode of the type C device to MCC (Step S912).

If the value Timer_4 of the counter_4 is not greater than 0, the microprocessor 111 notifies the USB CC logic and port controller 114 of the need to set the current mode of the type C device to HCC (Step S914).

In the embodiments of the invention, the amount of current drawn by the low-efficiency device is dynamically controlled based on the system loading, in order to increase the operational efficiency of the electronic device system. In this manner, the frequency and the number of times the operating frequency of the CPU/GPU is switched (increasing or decreasing) can be reduced. In addition, it is also helpful for the heat-dissipation design of the system and the efficiency thereof can be improved. In addition, since decreasing the power consumption of the low-efficiency device has no significant effect on the system performance of the electronic device, there will be no negative impact on user experience.

The embodiments of the present invention can be implemented in any of numerous ways. For example, the embodiments may be implemented using hardware, software, or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
   a device controller, coupled to a device for controlling the device; and
   a microprocessor, coupled to the device controller, obtaining information regarding an amount of power consumption of the electronic device and dynamically determining an amount of current provided to the device according to the amount of power consumption,
   wherein when the microprocessor determines that the amount of power consumption is greater than a threshold, the microprocessor determines to decrease the amount of current provided to the device, and
   wherein the device controller is an external device controller for controlling an external device connected to the electronic device via an input/output port.

2. The electronic device as claimed in claim 1, wherein the device controller initially sets a maximum allowable current drawn by the device as a first value according to a setting value, and when the microprocessor determines that the amount of power consumption is greater than the threshold, the microprocessor instructs the device controller to adjust the setting value, so as to set the maximum allowable current to a second value that is lower than the first value.

3. The electronic device as claimed in claim 2, wherein the setting value is a port type or a current mode, and when the microprocessor determines that the amount of power consumption is greater than the threshold, the external device controller adjusts the port type or the current mode so that the maximum allowable current drawn by the device in the adjusted port type or the adjusted current mode is reduced.

4. A method for dynamically controlling a current of an electronic device, comprising:
   obtaining information regarding an amount of power consumption of the electronic device, wherein the amount of power consumption is related to a loading of the electronic device; and dynamically determining an amount of current provided to a device according to the amount of power consumption, wherein when the amount of power consumption is greater than a threshold, decreasing the amount of current provided to the device, and wherein the device is an external device connected to the electronic device via an input/output port.

5. The method as claimed in claim 4, wherein the method further comprises:

when the amount of power consumption is greater than the threshold, adjusting a port type of the external device so that the maximum allowable current drawn by the external device in the adjusted port type is reduced.

6. The method as claimed in claim 4, wherein the method further comprises:

when the amount of power consumption is greater than the threshold, adjusting a current mode of the external device so that the maximum allowable current drawn by the external device in the adjusted current mode is reduced.

* * * * *